US010064021B1

(12) United States Patent
Aloni et al.

(10) Patent No.: US 10,064,021 B1
(45) Date of Patent: Aug. 28, 2018

(54) DEVICE AND METHOD FOR LOWER LATENCY DIGITAL AUDIO SAMPLE PLAYBACK

(71) Applicant: MOTOROLA SOLUTIONS, INC., Chicago, IL (US)

(72) Inventors: Eli Aloni, Kiryat Bialik (IL); Adam Gilboa, Maayan-Tzvi (IL); John M. De Sabatino, Sunrise, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/730,928

(22) Filed: Oct. 12, 2017

(51) Int. Cl.
| | |
|---|---|
| *H04W 4/10* | (2009.01) |
| *H04L 29/06* | (2006.01) |
| *H04W 76/00* | (2018.01) |
| *H04W 76/45* | (2018.01) |

(52) U.S. Cl.
CPC ........... *H04W 4/10* (2013.01); *H04L 65/4061* (2013.01); *H04W 76/005* (2013.01); *H04W 76/45* (2018.02)

(58) Field of Classification Search
CPC ...... H04W 4/10; H04W 76/45; H04L 65/4061
See application file for complete search history.

(56) References Cited

U.S. PATENT DOCUMENTS 8,554,138 B2   10/2013   Higgins et al.

OTHER PUBLICATIONS

Kim, Hyosu, et al., "SoundDroid: Supporting Real-Time Sound Applications on Commodity Mobile Devices", 2015 IEEE Real-Time Systems Symposium, IEEE Computer Society, pp. 285-294.
https://nsr.cse.buffalo.edu/wp-content/uploads/2016/10/rtdroid-sound-jtres16.pdf—Gokul, Girish, et al., "Real Time Sound Processing on Android", University at Buffalo, The State University of New York—downloaded Jun. 13, 2017.
https://developer.android.com/reference/android/media/SoundPool.htm—downloaded Jun. 13, 2017.
https://android.googlesource.com/platform/frameworks/base/+/0a887bc/media/jni/soundpool/SoundPool.h—downloaded Jun. 13, 2017.
https://source.android.com/devices/audio/—downloaded Jun. 13, 2017.
http://www.ikmultimedia.com/news/?item_id=5323—downloaded Jun. 13, 2017.
http://superpowered.com/0-latency-real-time-android-namm-2015—downloaded Jun. 13, 2017.

*Primary Examiner* — Raymond Dean
(74) *Attorney, Agent, or Firm* — Perry + Currier, Inc.

(57) ABSTRACT

A device and method for lower latency digital audio sample playback is provided. The device comprises: a hardware digital signal processor (DSP); higher and lower latency audio paths to the DSP; a kernel driver; a kernel random-access memory (RAM) including kernel RAM buffers accessible by the kernel driver; and a controller. The controller: prior to digital audio samples being used by an application, pre-loads, using the kernel driver, the samples at the kernel RAM buffers; responsive to a trigger in the application to play a given digital audio sample, determines, using a sample identifier of the given sample, whether the given sample is pre-loaded at the kernel RAM buffers; when the sample is pre-loaded, plays, using the DSP, the given sample via the lower latency path; and when the given digital audio sample is not pre-loaded, plays, using the DSP, the given sample via the higher latency path.

20 Claims, 7 Drawing Sheets

DEVICE AND METHOD FOR LOWER LATENCY DIGITAL AUDIO SAMPLE PLAYBACK

BACKGROUND OF THE INVENTION

An important key performance indicator for devices having Push-To-Talk functionality is the duration from a press of a Push-To-Talk key to when a Talk-Permit-Tone playback starts, indicating that a user of the device can start talking. This key performance indicator is referred to as a Push-To-Grant key performance indicator.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An important key performance indicator for devices having Push-To-Talk (PTT) functionality is the duration from a press of a PTT key to when a Talk-Permit-Tone playback starts, indicating that a user of the device can start talking. This key performance indicator is referred to as a Push-To-Grant key performance indicator (KPI). The Push-To-Grant KPI is heavily affected by device's tone playback latency, and the issue may be especially problematic in Android™ devices that are equipped with PTT functionality. In particular, the duration from when a PTT application requests to play the Talk-Permit-Tone to when playback actually starts can be higher than desired for emergency responders in Android™ devices equipped with PTT functionality. Indeed, the Android™ low latency specification for cold start audio playback (e.g. a time required to initialize an audio player and play a first audio frame of a digital audio file) is about 100 ms, which can be too long for emergency responder situations. In addition, as commercial Android™ devices are not required to meet the Android™ low latency specification, the delays can be higher than 100 ms.

An aspect of the specification provides a device comprising: a hardware digital signal processor (DSP); a higher latency audio path to the DSP; a lower latency audio path to the DSP, the lower latency audio path having lower latency than the higher latency audio path; a kernel driver; a kernel random-access memory (RAM) including kernel RAM buffers accessible by the kernel driver; and a controller configured to: prior to one or more digital audio samples being used by an application, pre-load, using the kernel driver, the one or more digital audio samples at the kernel RAM buffers; responsive to a trigger in the application to play a given digital audio sample, determine, using a sample identifier of the given digital audio sample, whether the given digital audio sample is pre-loaded at the kernel RAM buffers; when the given digital audio sample is pre-loaded at the kernel RAM buffers, play, using the DSP, the given digital audio sample via the lower latency audio path; and when the given digital audio sample is not pre-loaded at the kernel RAM buffers play, using the DSP, the given digital audio sample via a higher latency audio path.

Another aspect of the specification provides a method comprising: prior to one or more digital audio samples being used by an application, pre-loading, at a controller of a device, the controller using a kernel driver, the one or more digital audio samples at kernel random-access memory (RAM) buffers of a kernel RAM, the kernel RAM buffers accessible by the kernel driver; responsive to a trigger in the application to play a given digital audio sample, determining, at the controller, using a sample identifier of the given digital audio sample, whether the given digital audio sample is pre-loaded at the kernel RAM buffers; when the given digital audio sample is pre-loaded at the kernel RAM buffers, playing, using a hardware digital signal processor (DSP), the given digital audio sample via a lower latency audio path; and when the given digital audio sample is not pre-loaded at the kernel RAM buffers playing, using the DSP, the given digital audio sample via the higher latency audio path.

Figure 1:
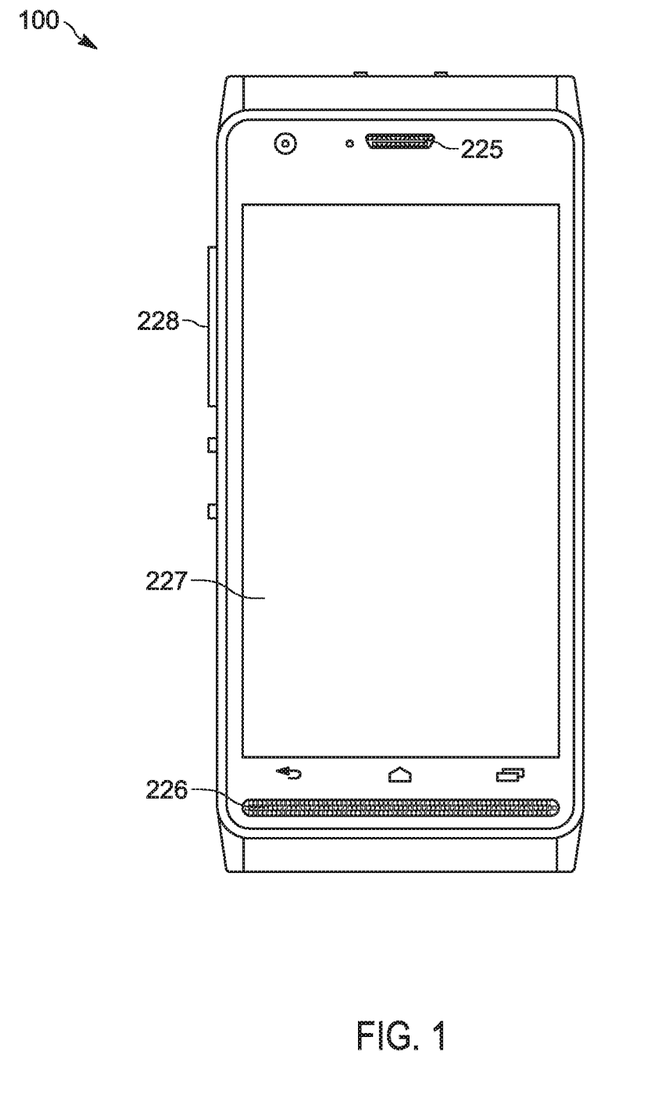
FIG. 1 depicts a perspective view of a device enabled for lower latency digital audio sample playback in accordance with some embodiments.
Figure 2:
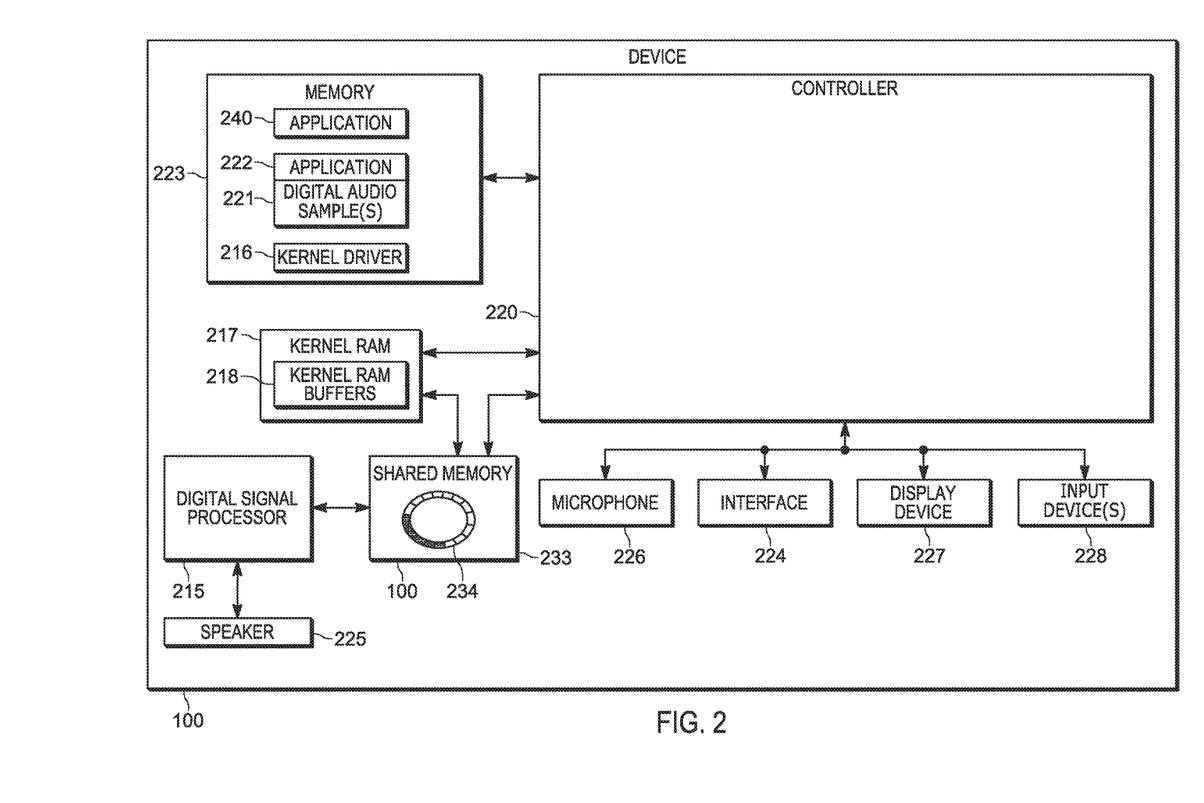
FIG. 2 depicts a block diagram of the device of FIG. 1 in accordance with some embodiments.

Attention is directed to FIG. 1 and FIG. 2 which respectively depict a perspective view and a block diagram of a device 100. The device 100 generally comprises a hardware digital signal processor (DSP) 215; a higher latency audio path to the DSP 215; a lower latency audio path to the DSP 215 (e.g. as respectively depicted in FIG. 5 and FIG. 7, described in further detail below), the lower latency audio path having lower latency than the higher latency audio path; a kernel driver 216; a kernel random-access memory (RAM) 217 including kernel RAM buffers 218 accessible by the kernel driver 216; and a controller 220 configured to: prior to one or more digital audio samples 221 being used by an application 222, pre-load, using the kernel driver 216, the one or more digital audio samples 221 at the kernel RAM buffers 218; responsive to a trigger in the application 222 to play a given digital audio sample 221, determine, using a sample identifier of the given digital audio sample, whether the given digital audio sample is pre-loaded at the kernel RAM buffers 218; when the given digital audio sample is pre-loaded at the kernel RAM buffers 218, play, using the DSP 215, the given digital audio sample via the lower latency audio path; and when the given digital audio sample is not pre-loaded at the kernel RAM buffers 218 play, using the DSP 215, the given digital audio sample via the higher latency audio path.

As depicted in FIG. 2, the device 100 further comprises a memory 223, a communications interface 224 (interchangeably referred to as the interface 224), a speaker 225, a microphone 226, a display device 227, and one or more input devices 228 which may include a PTT key. The device 100 further comprises a shared memory 233 that, as depicted, includes a ring buffer 234. The shared memory 233 may be a component of the memory 223 and is referred to as a "shared" memory as the shared memory 233 is shared between, for example, the DSP 215 and other resources of an operating system, such as a kernel and the like, of the device 100, for example to manage applications, windows, and other components of the operating system.

The memory 223 generally includes system RAM and/or user-space RAM (not depicted) and the kernel RAM 217. In general, the system RAM is not accessible directly by a kernel thread, while the kernel RAM 217 is accessible by the kernel thread, as described in further detail below.

As depicted the controller 220 has access to the kernel RAM 217, for example via the kernel driver 216, and the shared memory 233, and furthermore the shared memory 233 may output data, corresponding to the digital audio samples 221 at least temporarily received at ring buffer 234 from the controller 220 and/or the kernel RAM 217, to the DSP 215 which processes such data to control the speaker 225 to output sound corresponding to the digital audio samples 221, for example via a hardware audio codec (not depicted). The lower latency audio path and higher latency audio path to the DSP 215 are described in more detail below.

As described herein, the device 100 generally comprises a mobile device equipped with PTT functionality, and the application 222 may comprises a PTT application. Indeed, specific example embodiments will be described below with respect to playing Talk-Permit-Tones of a PTT application, assuming that the device 100 operates according to the Android™ operating system.

The device 100 may include, but is not limited to, any suitable combination of electronic devices, communication devices, computing devices, portable electronic devices, mobile computing devices, portable computing devices, tablet computing devices, laptop computers, telephones, PDAs (personal digital assistants), cellphones, smartphones, e-readers, mobile camera devices and the like. However, in some embodiments, the device 100 may include a display-free device such as a land-mobile radio, two-way radio and the like equipped, for example, with PTT functionality. Other suitable devices are within the scope of present embodiments including non-mobile devices, any suitable combination of work stations, servers, personal computers, dispatch terminals, operator terminals in a dispatch center, and the like. Indeed, any device equipped with PTT functionality, is within the scope of present embodiments. However, in some embodiments, the device 100 may not be equipped with PTT functionality; rather any device that plays digital audio samples using a DSP is within the scope of present embodiments.

In some embodiments, the device 100 is specifically adapted for emergency service radio functionality, and the like, used by emergency responders and/or first responders, including, but not limited to, police service responders, fire service responders, emergency medical service responders, and the like. As described in example embodiments, the device 100 may further include other types of hardware for emergency service radio functionality, including, but not limited to, push-to-talk functionality; for example, the interface 224 may be adapted for push-to-talk functionality. However, other devices are within the scope of present embodiments. Furthermore, the device 100 may be incorporated into a vehicle, and the like (for example an emergency service vehicle), as a radio, an emergency radio, and the like.

In yet further embodiments, the device 100 includes additional and/or alternative components related to, for example, telephony, messaging, entertainment, and/or any other components that may be used with a communication device.

With further reference to FIG. 2, DSP 215 comprises a specialized processor which may be at least partially dedicated to converting digital audio sample data to analog data for output to the speaker 225, for example via a hardware audio codec. Similarly, while not depicted, the DSP 215 may be further configured to convert analog sounds signals from the microphone 226 to digital audio samples, for example to be transmitted by the interface 224 and/or played by the speaker 225 (e.g. after another conversion from digital to analog).

The kernel driver 216 is a component which assists applications (such as the application 222) to communicate with hardware of the device 100. As will be described below, the kernel driver 216 specifically assists applications (such as the application 222) to communicate with the kernel RAM buffers 218 of the kernel RAM 217.

The controller 220 includes one or more logic circuits, one or more processors, one or more microprocessors, one or more ASIC (application-specific integrated circuits) and one or more FPGA (field-programmable gate arrays). In some embodiments, the controller 220 and/or the device 100 is not a generic controller and/or a generic device, but a device specifically configured to implement lower latency digital audio sample playback functionality. For example, in some embodiments, the controller 220 and/or the device 100 specifically comprises a computer executable engine configured to implement lower latency digital audio sample playback functionality.

The kernel RAM 217 may comprise one or more of a buffered RAM device and a registered memory device, which may be provided in addition to the memory 223. Indeed, the kernel RAM 217 is generally dedicated to kernel-based processes and is not generally accessible other than via the kernel driver 216.

The memory 223 includes a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")) (e.g. system RAM in addition to the kernel RAM 217). In general, the memory 223 comprises a system memory at which various applications, and the like, are stored, as well as digital audio samples for use in a higher latency audio path, as described in more detail below.

The kernel RAM 217 may comprise one or more of a buffered RAM device and a registered memory device, which may be provided in addition to the memory 223. Indeed, the kernel RAM 217 is generally dedicated to kernel-based processes and is not generally accessible to applications, and the like, other than via the kernel driver 216. Indeed, the kernel RAM 217 is different from system RAM that is accessible to applications, and the like. Furthermore, the system RAM is not accessible to a kernel thread, while the kernel RAM 217 is accessible to a kernel thread. In general, the kernel RAM 217 comprises a kernel random access memory at which digital audio samples are stored for use in a lower latency audio path, as described in more detail below.

The shared memory 233 may be different from the memory 223 and/or a component of the memory 223; in particular, the shared memory 233 may include a portion of the system memory 223 allocated for at least temporary storage of data to be output to the DSP 215.

Programming instructions (e.g., machine readable instructions) that implement the functional teachings of the device 100 as described herein are maintained, persistently, at the memory 223 and used by the controller 220 which makes appropriate utilization of volatile storage during the execution of such programming instructions.

In particular, the memory 223 stores instructions corresponding to an application 240 that, when executed by the controller 220, enables the controller 220 to implement lower latency digital audio sample playback functionality associated with the application 240. In the examples described herein, when the controller 220 executes the application 240, the controller 220 is enabled to: prior to one or more digital audio samples 221 being used by an application 222, pre-load, using the kernel driver 216, the one or more digital audio samples 221 at the kernel RAM buffers 218; responsive to a trigger in the application 222 to play a given digital audio sample 221, determine, using a sample identifier of the given digital audio sample, whether the given digital audio sample is pre-loaded at the kernel RAM buffers 218; when the given digital audio sample is pre-loaded at the kernel RAM buffers 218, play, using the DSP 215, the given digital audio sample via the lower latency audio path; and when the given digital audio sample is not pre-loaded at the kernel RAM buffers 218 play, using the DSP 215, the given digital audio sample via the higher latency audio path.

In particular, the application 240 may include components of an operating system of the device 100 and/or an audio architecture of the device 100, and/or the application 240 may operate in conjunction with the operating system of the device 100 and/or the audio architecture of the device 100.

It is further assumed that the device 100 includes a higher latency audio path to the DSP 215 and a lower latency audio path to the DSP 215, the lower latency audio path having lower latency than the higher latency audio path. In particular, some of the digital audio samples 221 may be played via the higher latency audio path, while others of the digital audio samples 221 may be played via the lower latency audio path. As will be described below, portions of the higher latency audio path and the lower latency audio path may overlap, however the lower latency audio path, generally bypasses one or more portions of the higher latency audio path.

The difference in latency of the paths may be due to how resampling of a digital audio sample 221 occurs in conjunction with each of the paths. For example, a digital audio sample 221 may have been produced according to a first sampling rate which is different from sampling rate native to the DSP 215. As such, a digital audio sample 221 that is to be played, is generally resampled, prior to playing, according to the sampling rate native to the DSP 215. The timing of a digital audio sample 221 being resampled according to each of the paths is different.

For example, when a digital audio sample 221 is played via the lower latency audio path, a digital audio sample 221 is resampled, for example using the kernel driver 216, according to a sampling rate native to the DSP 215 prior to pre-loading the one or more digital audio samples at the kernel RAM buffers 218, and prior to being played and/or used by the application 222. Hence, a digital audio sample 221 stored at the kernel RAM buffers 218 has already been resampled and, when it is to be played by the DSP 215, for example, when called by the application 222, there is no need to repeat the resampling, and may be played by the DSP 215 faster than a digital audio sample 221 played via the higher latency audio path.

However, when a digital audio sample 221 is played via the higher latency audio path, a digital audio sample 221 is not resampled and pre-loaded into the kernel RAM buffers 218; rather a digital audio sample 221 played via the higher latency audio path may be stored in system RAM and resampled to a sampling rate native to the DSP 215 only when the digital audio sample 221 is to be played. Put another way, in the higher latency audio path, a digital audio sample 221 is resampled at each time the digital audio sample 221 is called by the application 222 to be played by the DSP 215. Furthermore, in the higher latency audio path, in the addition to resampling latency overhead, further latency overhead may occur to a process of mixing and/or combining a resampled digital audio sample 221 with other audio streams that are currently being played, which may require additional processing resources, which are not used in the lower latency audio path.

Furthermore, the kernel RAM buffers 218 dedicated for the lower latency audio path are allocated from the kernel RAM 217, as compared to system RAM used in the higher latency audio path. For example, the kernel RAM buffers 218 for the lower latency audio path be allocated using a kmalloc(GFP_KERNEL) Linux operator (e.g. Linux being the operating system which underlies the Android™), as compared to an Anroid™ malloc/new operator used to allocate system RAM.

The interface 224 is generally configured to communicate and/or wirelessly communicate, with other devices using, one or more communication channels, the interface 224 being implemented by, for example, one or more radios and/or antennas and/or connectors and/or network adaptors, configured to communicate, for example wirelessly communicate, with network architecture that is used to communicate with the other devices, and the like. The interface 224 may include, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 802.16 standard, and/or other similar type of wireless transceiver configurable to communicate via a wireless network for infrastructure communications. In yet further embodiments, the interface 224 includes one or more local area network or personal area network transceivers operating in accordance with an IEEE 802.11 standard (e.g., 802.11a, 802.11b, 802.11g), or a Bluetooth transceiver. In some embodiments, the interface 224 is further configured to communicate "radio-to-radio" on some communication channels, while other communication channels are configured to use wireless network infrastructure.

Example communication channels over which the interface 224 is generally configured to wirelessly communicate include, but are not limited to, one or more of wireless channels, cell-phone channels, cellular network channels, packet-based channels, analog network channels, Voice-Over-Internet ("VoIP"), push-to-talk channels and the like, and/or a combination. Indeed, the term "channel" and/or "communication channel", as used herein, includes, but is not limited to, a physical radio-frequency (RF) communication channel, a logical radio-frequency communication channel, a trunking talkgroup (interchangeably referred to herein a "talkgroup"), a trunking announcement group, a VOIP communication path, a push-to-talk channel, and the like.

The speaker 225 generally comprises any combination of speakers (including, but not limited to headphones and/or a headset connected (wirelessly or via wires) to the device 100) that may be controlled by the DSP 215 for example to play and/or output sound corresponding to the digital audio samples.

Similarly, the microphone 226 generally comprises any combination of microphones (including, but not limited to headphones and/or a headset connected (wirelessly or via wires) to the device 100) that may receive sound to be converted to audio information that may be played and/or output by the speaker 225 and/or transmitted by the interface 224, for example using PTT functionality.

The display device 227 may comprise any suitable one of, or combination of, flat panel displays (e.g. LCD (liquid crystal display), plasma displays, OLED (organic light emitting diode) displays) and the like, as well as one or more optional touch screens (including capacitive touchscreens and/or resistive touchscreens). In some embodiments, however, the display device 227 is optional; for example, the device 100 may comprise a land-mobile radio, a two-way radio and the like.

The one or more input devices 228 comprises any suitable one of, or combination of keyboards, pointing devices, touchpads, touchscreens, buttons, and the like.

In particular, in some embodiments, the one or more input devices 228 may include a PTT key which, when operated by a user of the device 100 causes the device 100 to initiate a PTT session using, for example, a PTT application; once the device 100 plays, at the speaker 225, a Talk-Permit-Tone (that may be stored as one of the digital audio samples 221, assuming that the application 222 comprises a PTT application), the user may speak into the microphone 226 to speak with other users of other devices.

While not depicted, in some embodiments, the device 100 includes a battery that includes, but is not limited to, a rechargeable battery, a power pack, and/or a rechargeable power pack. However, in other embodiments, the device 100 is incorporated into a vehicle and/or a system that includes a battery and/or power source, and the like, and power for the device 100 is provided by the battery and/or power system of the vehicle and/or system; in other words, in such embodiments, the device 100 need not include an internal battery.

In any event, it should be understood that a wide variety of configurations for the device 100 are within the scope of present embodiments.

Figure 3:
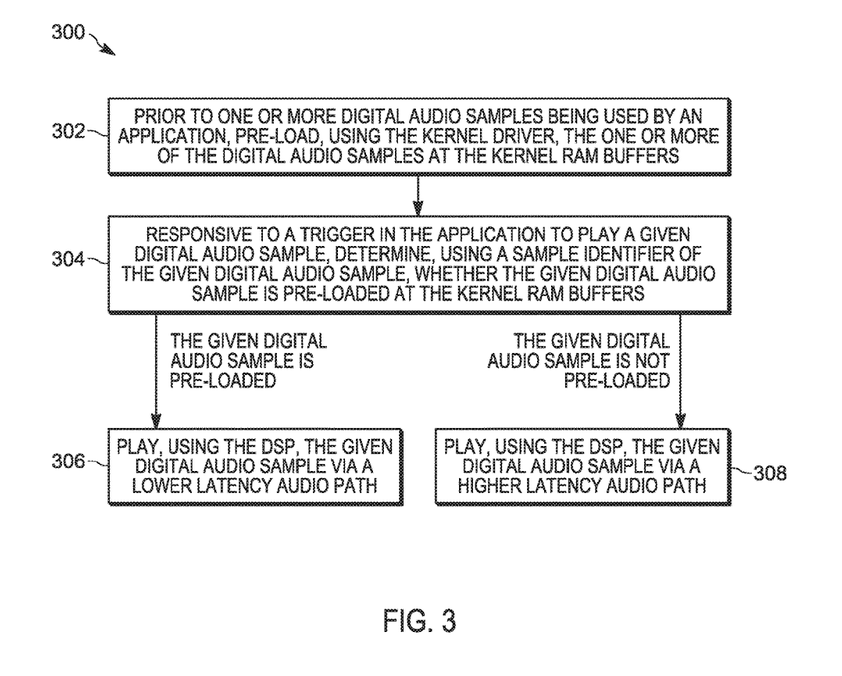
FIG. 3 is a flowchart of a method of lower latency digital audio sample playback in accordance with some embodiments.

Attention is now directed to FIG. 3 which depicts a flowchart representative of a method 300 for lower latency digital audio sample playback functionality. In some embodiments, the operations of the method 300 of FIG. 3 correspond to machine readable instructions that are executed by, for example, the device 100, and specifically by the controller 220. In the illustrated example, the instructions represented by the blocks of FIG. 3 are stored at the memory 223, for example, as the application 240. The method 300 of FIG. 3 is one way in which the device 100 and/or the controller 220 is configured. Furthermore, the following discussion of the method 300 of FIG. 3 will lead to a further understanding of the device 100, and its various components.

However, it is to be understood that the device 100, and/or the controller 220 and/or the method 300 may be varied, and need not work exactly as discussed herein in conjunction with each other, and that such variations are within the scope of present embodiments.

Furthermore, the method 300 of FIG. 3 need not be performed in the exact sequence as shown and likewise various blocks may be performed in parallel rather than in sequence. Accordingly, the elements of method 300 are referred to herein as "blocks" rather than "steps".

At a block 302, the controller 220, prior to one or more digital audio samples 221 being used by an application 222, pre-loads, using the kernel driver 216, the one or more of digital audio samples 221 at the kernel RAM buffers 218.

At a block 304, the controller 220, responsive to a trigger in the application 222 to play a given digital audio sample 221, determines, using a sample identifier of the given digital audio sample, whether the given digital audio sample is pre-loaded at the kernel RAM buffers 218.

When the given digital Sample has been pre-loaded, as determined at the block 304, at a block 306, the controller 220 plays, using the DSP 215, the given digital audio sample via a lower latency audio path.

When the given digital Sample has not been pre-loaded, as determined at the block 304, at a block 308 the controller 220 plays, using the DSP 215, the given digital audio sample via a higher latency audio path.

Example embodiments of the method 300 will now be described with respect to FIG. 4 to FIG. 7. It will be furthermore assumed in the following example embodiments, that the device 100 is operating according to the Android™ operating system; however, while certain Android™-specific components will be described, the device and method of the present specification may be implemented in other operating systems and/or at devices not operating according to the Android™ operating system.

Furthermore, in each of FIG. 4 to FIG. 7 it is assumed that the components depicted are being implemented at the controller 220, and are making use of processing resources and/or memory resources and/or hardware resources at the device 100. In other words, each component described in FIG. 4 to FIG. 7 is generally implemented using hardware resources.

The higher latency audio path to the DSP 215 will first be described with respect to FIG. 4 and FIG. 5, in which the application 222 plays a digital audio sample 221 via the higher latency audio path.

Figure 4:
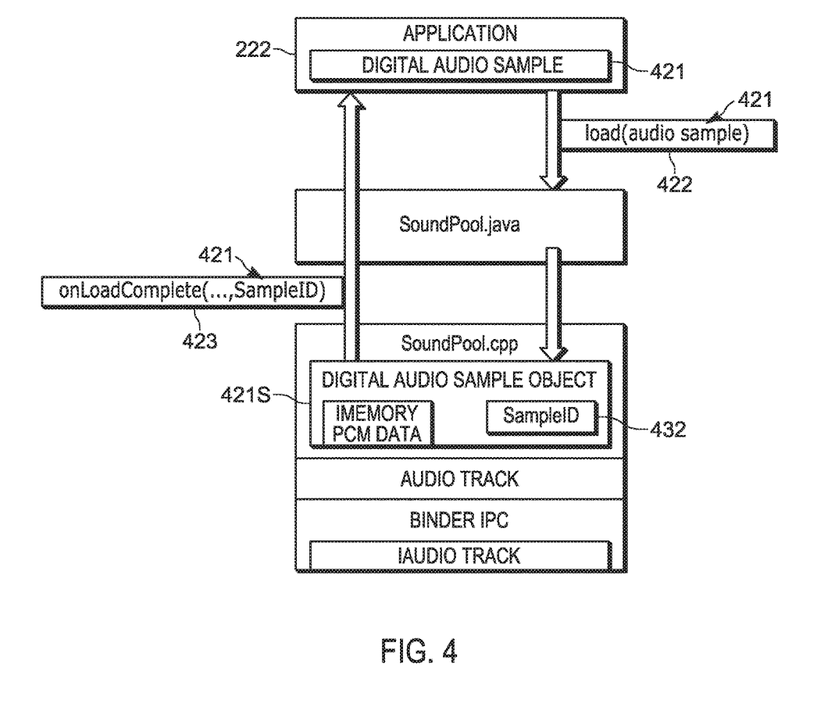
FIG. 4 depicts loading of a digital audio sample of an application for playback using a higher latency audio path in accordance with some embodiments.

Hence, attention is next directed to FIG. 4 which depicts the application 222 being implemented, for example by the controller 220, as well as components of the Android™ operating system, and/or the Android™ audio framework. In particular, the application 222 is in communication with "SoundPool" class Android™ components which manage and play audio resources for applications in the Android™ operating system. In particular, the SoundPool object in Android™ is a collection of digital audio samples that may be loaded into a memory from a resource inside the Android™ Package Kit (APK) and/or from a file and/or application such as the application 222. Furthermore, each digital audio sample in the SoundPool object is defined by a Sample Class, which contains information (e.g. in fields) about the digital audio sample such as a sample identifier, a sample format, a sample rate (e.g. a sampling rate), a sample size, and a pointer (e.g. a memory address and the like) to a memory where raw pulse-code modulation (PCM) sample data is stored (e.g. in system RAM at the memory 223).

The application 222, for example when the application 222 is initially executed by the controller 220, generally loads an associated digital audio sample 221 to the SoundPool object prior to playing it, for example as a "Sample" object stored at the system RAM. Hence, for example, via a "Soundpool.java" component, the application 222 loads a given digital audio sample 421 to a "Soundpool.cpp" component as field of a Soundpool "load" API 422. Such loading may include, but is not limited to, loading the pointer of where PCM data of the given digital audio sample 421 is stored at the memory 223.

Once the given digital audio sample 421 is loaded successfully into the Soundpool object, an instance of a Class type "Sample" Object 421S is generated at the Soundpool object that includes the PCM data of the loaded given digital audio sample 421, and/or a memory address of the PCM data at the memory 223. Hence, at least an indication of the given digital audio sample 421 is at least temporarily stored at the Soundpool.cpp component as a "Sample" object 421S.

As depicted in FIG. 4, The Soundpool object assigns the given digital audio sample object 421S a sample identifier 432 ("sampleID"), which is returned to the application 222 as a field of a SoundPool "onLoadComplete" API 423. The sample identifier 432 comprises a number, and the like, which may be used by the application 222 to play the given digital audio sample 421 corresponding to the given digital audio sample object 421S using the Soundpool object.

As depicted, the given digital audio sample object 421S comprises "IMemory" PCM data that comprises a pointer (e.g. a memory address) to the PCM data (e.g. as stored in the system RAM in the memory 223) of the given digital audio sample 421 produced using a sampling rate that may be different from the native sampling rate of the DSP 215. The term "IMemory" refers to an Android™ interface used to access the system RAM of a memory, such as location in the memory 223 and/or a cache of the controller 220 where the PCM data of the given digital audio sample 421 is stored.

Also depicted in FIG. 4 are further Android™ components "AudioTrack" and "Binder IPC" ("inter-process communication") which are both components of the Android™ audio framework. AudioTrack generally manages and plays a single audio resource for applications, and Binder IPC facilitates communication over process boundaries (e.g. from the Soundpool object to a media server such as AudioFlinger, described below, for example using "IAudioTrack", which is a proxy for AudioTrack; while not depicted, BinderIPC may further include a proxy of for the media server, for example a proxy iAudioFlinger, to further facilitate communication between AudioTrack and AudioFlinger.

Figure 5:
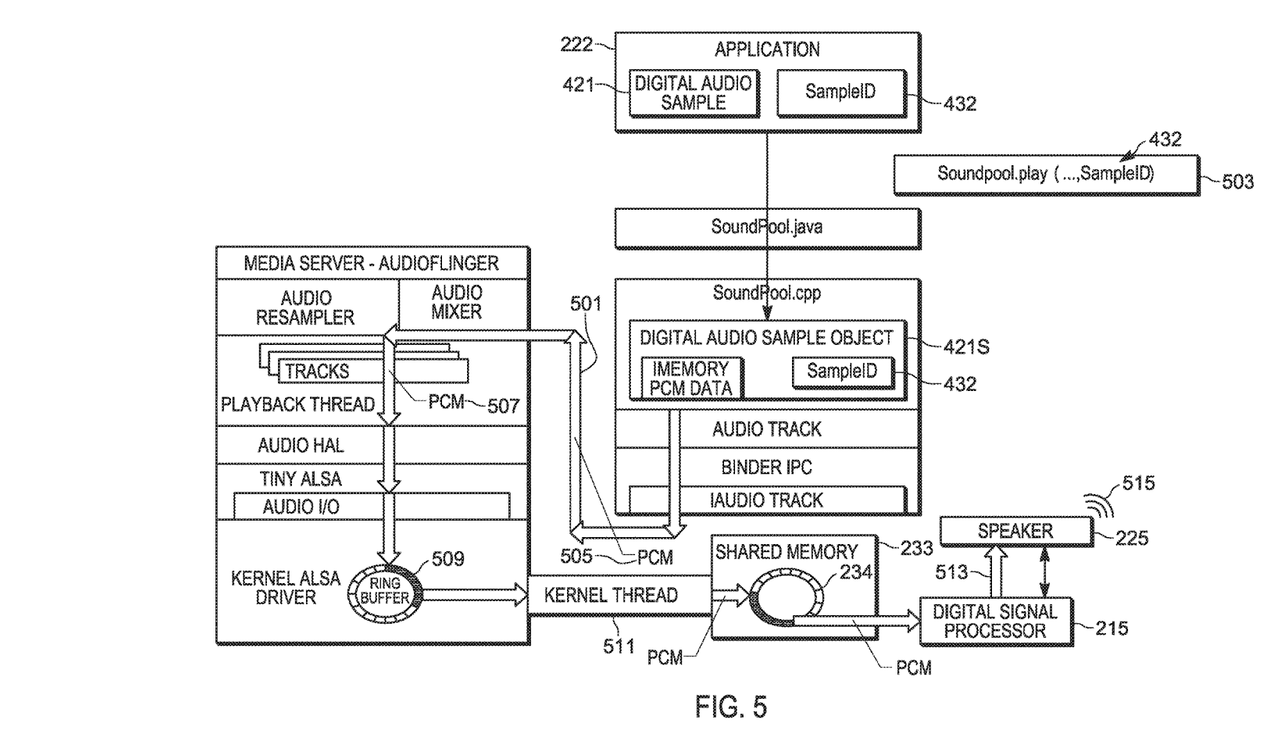
FIG. 5 depicts playback of a digital audio sample of an application using a higher latency audio path in accordance with some embodiments.

Attention is next directed to FIG. 5 which depicts the components of FIG. 4, as well as additional components of the Android™ operating system, and/or the Android™ audio framework, and a higher latency audio path 501 according to example embodiments.

In particular, when the application 222 is to play a sound at the speaker 225 corresponding to the given digital audio sample 421 identified by the sample identifier 432, the application 222 triggers playing the sound using a SoundPool.play( . . . , sampleID) API 503 to convey the sample identifier 432 to the SoundPool object, which responsively generates an "AudioTrack" Object (e.g. at "AudioTrack") using the PCM data of the given digital audio sample object 421S, as retrieved from the system RAM, and will pass the memory address 505 of the PCM data to AudioFlinger, which is an Android™ media server.

AudioFlinger will generate threads by retrieving the PCM data from the address 505 to playback, mix and resample the PCM data in an audio stream 507, via, for example, an "Audio Resampler" object, an "Audio Mixer" object, and a "Playback Thread" object. The AudioFlinger resamples the PCM data to generate an audio stream 507 and mixes the audio stream 507 with other active audio streams at the device 100. In other words, along the higher latency audio path 501, AudioFlinger resamples the PCM data to a native resampling rate of the DSP 215 to generate an audio stream 507 mixed with any other audio streams at the device 100.

AudioFlinger pushes the mixed audio streams (e.g. in pieces) as a thread through an Audio HAL (hardware abstraction layer, which may be specific to a manufacturer of the device 100) and through a TinyALSA (Advanced Linux Sound Architecture), to a ring buffer 509 located in an ALSA kernel driver, each of which are components of the Linux operating system which underlies the Android™ operating system. From the ring buffer 509, the audio stream 507 is passed via a kernel thread 511 to the ring buffer 234 of the shared memory 233, and from the ring buffer 234 to the DSP 215.

In particular, the kernel thread 511 is dedicated to fetching small chunks and/or packets of resampled PCM data in the audio stream from the ring buffer 509 and forwarding them to the shared memory 233 (e.g. the chunks and/or packets being of a size compatible with the ring buffer 209), which is shared with the kernel of the Android™ operating system and the DSP 215. However, the kernel thread 511 cannot, in general, access the system RAM of the memory 223. Hence, the shared memory 233 provides a path for transferring the resampled PCM data to the kernel thread 511. In general, the system RAM is not accessible directly by a kernel thread, while the kernel RAM 217 is accessible by the kernel thread, as described in further detail below.

The DSP 215 will fetch the PCM chunks, and/or packets, from the shared memory 233, process the PCM chunks, and/or packets, and will forward process PCM chunks, and/or packets, to a hardware audio codec (not depicted) for playback as sound 515 at the speaker 225. In other words, the DSP 215, in combination with a hardware audio codec, converts the audio stream 507 to an analog signal 513 used to drive the speaker 225 to emit sound 515 corresponding to the given digital audio sample 421.

Hence, in the depicted example, the higher latency audio path 501 is from the application 222 to the Soundpool component, through the Audio Track and Binder IPC components to the AudioFlinger component, through the various components of AudioFlinger where resampling and mixing occurs, then through the ALSA components to the shared memory 233 and then to the DSP 215. Hence, the AudioFlinger thread that is passed to the kernel ALSA driver acts as a producer of the resampled PCM data in the audio stream 507, while the kernel thread 511 acts as a consumer of the resampled PCM data in the audio stream 507.

In other words, each time the given digital audio sample 421 is to be played by the DSP 215, for example using the speaker 225, the corresponding PCM data is resampled at the native sampling rate of the DSP 215, and mixed with other audio streams which may lead to latency times of more than 100 ms, which may be unacceptable when the given digital audio sample 421 comprises a Talk-Permit-Tone of a PTT application. Put another way, in the higher latency audio path, a digital audio sample is retrieved from a system memory and resampled at each instance of the application 222 triggering playing of the digital audio sample in the higher latency audio path.

Figure 6:
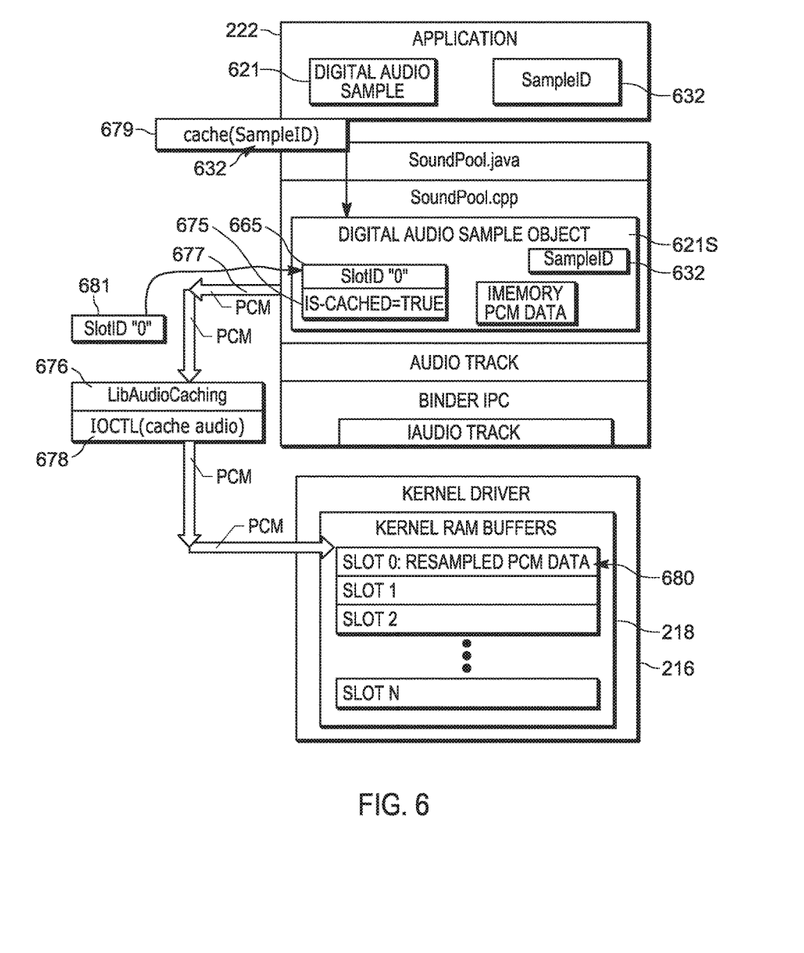
FIG. 6 depicts loading of a digital audio sample of an application for playback using a lower latency audio path in accordance with some embodiments.
Figure 7:
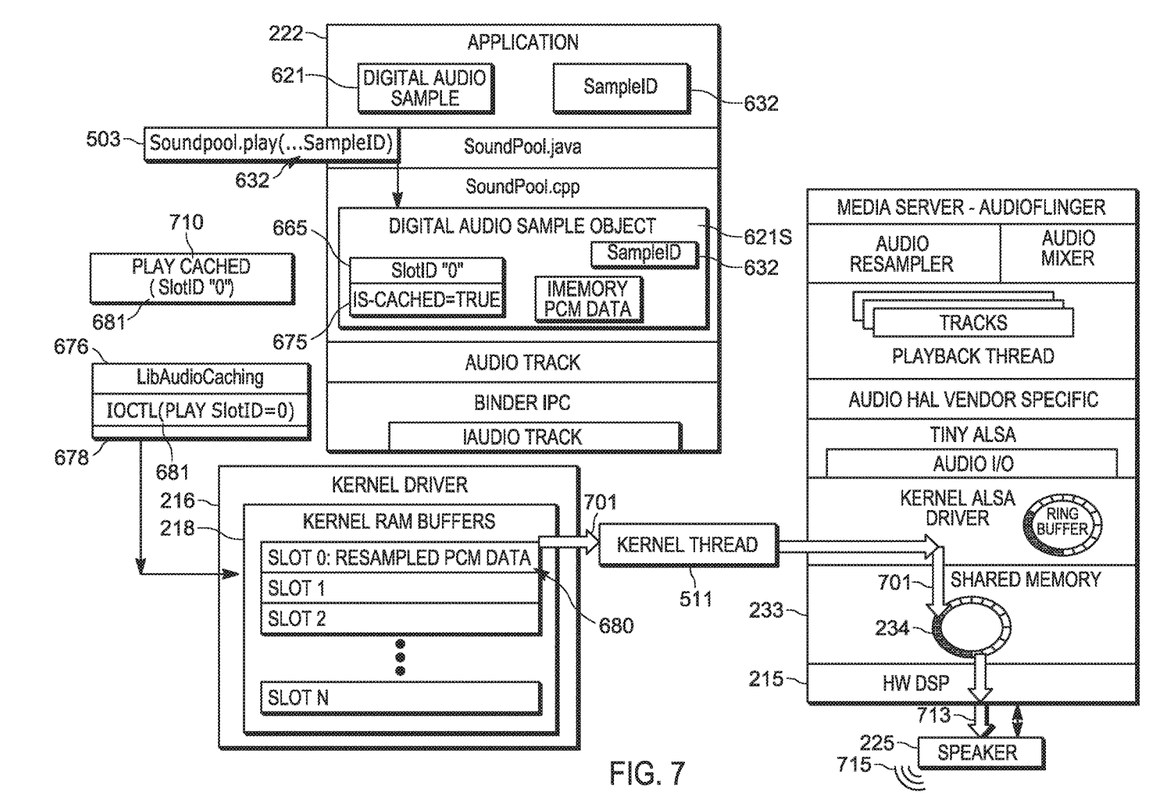
FIG. 7 depicts playback of a digital audio sample of an application using a lower latency audio path in accordance with some embodiments.

Attention is next directed to FIG. 6 to FIG. 7 which describes the lower latency audio path to the DSP 215, in which the application 222 plays a digital audio sample 221 via the lower latency audio path.

FIG. 6 is similar to FIG. 4, with like elements having like numbers and/or labels. It is assumed in FIG. 6 that the loading process depicted in FIG. 4 has occurred for a given digital audio sample 621, of the digital audio samples 221, to be played using the lower latency audio path. In particular, it is assumed that the given digital audio sample 621 has been loaded to the Soundpool object, for example at the system RAM, and a sample identifier 632 has been assigned to a corresponding given digital audio sample object 621S.

However, also depicted in FIG. 6 is a SoundPool.cache (sampleID) API 679, which is called by the application 222 to indicate to the Soundpool object that the given digital audio sample 621, having the sample identifier 632 in the SoundPool.cache(sampleID) API 679, is to be played via the lower latency audio path.

For example, within the application 222, a subset of the digital audio samples 221 may be designated as being "urgent" and/or "mission-critical" (and the like) sounds that are to be resampled and pre-loaded from the system RAM into the kernel RAM buffers 218 prior to the sounds being played; as such, when the application 222 receives a sample identifier that corresponds to a digital audio sample 221 designated as being "urgent" and/or "mission-critical" (and the like), the application 222 calls the SoundPool.cache (sampleID) API 679 with the sample identifier in a sampleID field of the SoundPool.cache(sampleID) API 679.

Put another way, the controller 220 may be further configured to, determine, at the application 222, a subset of a plurality of associated digital audio samples 221 to be pre-loaded at the kernel RAM buffers 218 as one or more digital audio samples to be played via the lower latency audio path; for example, a subset of the plurality of associated digital audio samples may be designated as mission-critical audio samples, for example within the application 222.

Within the context of the Android™ operating system the SoundPool.cache(sampleID) API 679 is a new API, and may be defined as "hidden" (e.g. to comply with the Android™ Compatibility Definition Document (CDD)); further applications will be able to call the SoundPool.cache(sampleID) API 679 indirectly by using an Android™ Software Development Kit (SDK) add-On.

Again, within the context of the Android™ operating system, new fields may be added to the existing Sample Class: a SlotID field 665 which may comprise an integer-type field, with a default value of "−1"; and an Is-Cached field 675 which may comprise a Boolean-type field, with a default value of "FALSE".

Indeed, with brief reference back to FIG. 4, the digital audio sample 421 may also be stored with a SlotID field with a default value of "−1" and an Is-Cached field with a default value of "FALSE". The respective values of "−1" and "FALSE" indicate that the digital audio sample 421 is to be played using the higher latency audio path 501. Indeed, any digital audio sample 221 loaded in the Soundpool object as Sample objects may include a SlotID field and an Is-Cached field.

Again, within the context of the Android™ operating system, the kernel driver 216, which has access to the kernel RAM buffers 218 is new and will resample and cache PCM data received from the Sample Object at the Soundpool Object into dedicated RAM buffer slots, for example via a "native" user space "LibAudioCaching" library 676 (e.g. the "native" user space "LibAudioCaching" library 676 may be implemented a native machine language of a processor and/or the controller 220). Hence, the "LibAudioCaching" library 676 may be executed without any mediator at the controller 220. Furthermore, the name "LibAudioCaching" is merely an example descriptive name of the library 676, and the library 676 may be provided with any suitable name. In general, the "LibAudioCaching" library 676 enables the Soundpool object to communicate with the kernel driver 216. As such, in FIG. 6, the kernel RAM buffers 218 are schematically depicted as being inside the kernel driver 216, however such a depiction is merely meant to indicate that the kernel driver 216 has access to the kernel RAM buffers 218, which are hardware components.

Once the application 222 has received the sample identifier 632 for the loaded given digital audio sample 621 (e.g. the given digital audio sample object 621S is loaded in system RAM), the application 222 may cause the given digital audio sample 621 to be later played using the lower latency audio path using an SoundPool.cache(sampleID) API 679. In particular, the Soundpool object (and/or the sample object 621S corresponding to the given digital audio sample 621) forwards the raw PCM data 677 and/or a memory address thereof to the kernel driver 216 via the LibAudioCaching library 676 (which uses an input/output control IOCTL system call 678 to the kernel driver 216, for example using a "cache audio" field of the IOCTL system call 678 to convey the PCM data to the kernel driver 216).

The kernel driver 216 resamples the received "raw" PCM data (e.g. in its own native sampling rate) to support the native hardware sampling rate of the DSP 215 and stores the resampled PCM data 680 in an available free slot in the kernel RAM buffers 218, as depicted Slot "0". Indeed, resampled PCM data of more than one digital audio sample may be loaded into the kernel RAM buffers 218, and the kernel driver 216 stores each set of resampled PCM data into a next available free slot.

The resampling and storing may occur via the controller 220, at the block 302 of the method 300, implementing the kernel driver 216.

Put another way, the controller 220 may be further configured to resample, at the kernel driver 216, one or more digital audio samples 221 according to a sampling rate native to the DSP 215 prior to pre-loading the one or more digital audio samples at the kernel RAM buffers 218.

The kernel driver 216 returns a slot identifier 681 (e.g. "0") to the sample object 621S corresponding to the given digital audio sample 6211 the sample object 621S stores the slot identifier 681 in the SlotID field 665. The sample object 621S corresponding to the given digital audio sample 621 further sets the Is-Cached field to "True" to indicate that the resampled PCM data 680 of the given digital audio sample 621 is stored in a slot of the kernel RAM buffers 218 identified by the slot identifier 681 in the SlotID field 665.

Indeed, each of the one or more digital audio samples 221 pre-loaded at the kernel RAM buffers 218 is thereafter associated with a respective buffer identifier (e.g. a slot identifier) and a respective sample identifier, for example at the Soundpool Object stored in the system RAM. Put another way, PCM data of a digital audio sample 221 from system RAM is resampled, the resampled PCM data is stored and/or copied to the kernel RAM 217 (e.g. the kernel RAM buffers 218).

Furthermore, each of the one or more digital audio samples 221 pre-loaded at the kernel RAM buffers 218 is thereafter associated with a respective Boolean identifier (e.g. at an Is-Cached field) indicating whether a respective digital audio sample is pre-loaded at the kernel RAM buffers 218. As described above, the Boolean identifier is "True", and the like, when a digital audio sample is resampled and pre-loaded at the kernel RAM buffers 218, and the Boolean identifier is "False", and the like, when a digital audio sample is not resampled and pre-loaded at the kernel RAM buffers 218. Put another way, when the Boolean identifier is "False", the digital audio sample is stored at the system RAM and has not been re-sampled prior to being called by the application 222. Hence, a sample identifier received from the application 222 may be used to determine whether a corresponding digital audio sample is resampled and pre-loaded at the kernel RAM buffers 218 based on the Boolean value in the Is-Cached field, and hence available to be played via the lower latency audio path.

Attention is next directed to FIG. 7 which depicts the components of FIG. 6, as well as additional components of the Android™ operating system, and/or the Android™ audio framework, a lower latency audio path 701, as well as components used by the higher latency audio path 501 from FIG. 5, with like elements in FIG. 7 to like elements in FIG. 5 and FIG. 6 having like numbers and/or labels.

When the given digital audio sample 621 is to be played via the lower latency audio path 701, the application 222 calls the SoundPool.play(sampleID) API 503 using the sample identifier 632 of the given digital audio sample 621.

For example, assuming that the application 222 comprises a PTT application, and the given digital audio sample 621 corresponds to a Talk-Permit-Tone, the application 222 calls the SoundPool.play(sampleID) API 503 using the sample identifier 632 when the Talk-Permit-Tone is to be played after a PTT key is activated.

The SoundPool object will fetch the matching Sample Object corresponding to the given digital audio sample 621 and check whether the Is-Cached field 675 is "True" or "False" for example to determine, at the block 304 of the method 300, whether the given digital audio sample 621 is pre-loaded at the kernel RAM buffers 218.

Indeed, the application 222 calling the SoundPool.play (sampleID) API 503 acts as a trigger (e.g. at the block 304 of the method 300) to play a given digital audio sample and responsively determine, using a sample identifier of the given digital audio sample, whether the given digital audio sample is pre-loaded at the kernel RAM buffers 218. For example, the controller 220 may be further configured to determine using the sample identifier of a given digital audio sample, whether the given digital audio sample is pre-loaded at the kernel RAM buffers 218 by determining whether the given digital audio sample is associated with a respective Boolean identifier indicating whether the given digital audio sample is pre-loaded at the kernel RAM buffers 218.

Hence, when the Is-Cached field 675 is "False" then playback of the given digital audio sample 621 will occur via the higher latency audio path 501 (e.g. as depicted in FIG. 5, and as implemented at the block 308 of the method 300).

However, when the Is-Cached field 675 is "True" than playback of the given digital audio sample 621 will occur via the lower latency audio path 701 (e.g. at the block 306 of the method 300) by passing the slot identifier 681 stored in the SlotID field 665 to the kernel driver 216 using a PlayCached (slotID) API 710 to pass the slot identifier 681 to the kernel driver 216 via the LibAudioCaching library 676, which in turn uses the IOCTL system call 678 to pass the slot identifier 681 to the kernel driver 216.

The kernel driver 216 will provide the resampled PCM data 680 to the DSP 215 via the lower latency audio path 701 by providing chunks, and/or packets, of the resampled PCM data 680 to the ALSA kernel driver the kernel thread 511, which in turn will send them to the ring buffer 234 at the shared memory 233 to be consumed by the DSP 215, bypassing the ring buffer of the kernel ALSA driver. Indeed, while as depicted the lower latency audio path 701 is depicted as being through the kernel ALSA driver, the lower latency audio path 701 may bypass the kernel ALSA driver completely such that the kernel driver 216 may provide chunks, and/or packets, of the resampled PCM data 680 to the shared memory 233, bypassing the kernel ALSA driver. The DSP 215 will fetch the PCM chunks, and/or packets, from the shared memory 233, will process them and will forward them to a hardware audio codec for playback as sound 715 at the speaker 225. In other words, the DSP 215, in combination with a hardware audio codec (not depicted) converts the audio stream 507 to an analog signal 713 used to drive the speaker 225 to emit sound 715 corresponding to the given digital audio sample 421.

In other words, the lower latency audio path 701 is from the kernel RAM buffers 218 to the shared memory 233 (and, in some embodiments, the ALSA kernel driver), and bypasses one or more portions of the higher latency audio path 501, including the AudioFlinger and Resampler object. Indeed, as the resampled PCM data 680 has already been resampled, there is no need to again resample. In other words, when the given digital audio sample 621 is pre-loaded at the RAM buffers as the resampled PCM data 680, the given digital audio sample 621 is already in a format that may be passed to the shared memory 233 (and/or the ALSA kernel driver) without further resampling, as compared to the higher latency audio path 501 where PCM data of a given digital audio sample is resampled each time it is called.

Furthermore, the kernel thread 511 generally may fetch and/or retrieve data from the kernel RAM 217 but not the system RAM; hence, in the lower latency audio path, there is a faster path for the resampled PCM data to follow than through the higher latency audio path. For example, in the higher latency audio path, the kernel thread 511 fetches data from the ring buffer 509 and forwards the data to the shared memory 233, while in the lower latency audio path, the kernel thread 511 fetches data from the RAM buffers 218 and forwards the data to the shared memory 233, bypassing the ring buffer 509 of the kernel ALSA driver and/or the kernel ALSA driver.

Indeed, the given digital audio sample 621, played via the lower latency audio path 701, is retrieved from the kernel RAM buffers 218, as the resampled PCM data 680, and hence the lower latency audio path 701 has lower latency than the higher latency audio path 501.

Put another way, the controller 220 may be further configured to: when a given digital audio sample is present in the kernel RAM buffers 218 play, using the DSP 215, the given digital audio sample (e.g. in the form of corresponding resampled PCM data) via the lower latency audio path 701 by providing a respective buffer identifier (e.g. a slot identifier) to the kernel driver 216. Furthermore, the controller 220 may be further configured to, retrieve, using the kernel driver 216, the given digital audio sample (e.g. in the form of corresponding resampled PCM data) from the kernel RAM buffers 218 using a respective buffer identifier, and provide the given digital audio sample to the DSP 215.

Furthermore, in the lower latency audio path 701, the resampled PCM data provided to the ring buffer 234 of the shared memory 233 may be given higher priority (e.g. by the kernel driver 511) at the ring buffer 234 of the shared memory 233 over audio streams that are being provided to the ring buffer 234 of the shared memory 233 via the higher latency audio path 501. For example, the resampled PCM data from the RAM buffers 218 in the lower latency audio path 701 may supersede audio streams from the higher latency audio path 501, and/or the audio streams from the higher latency audio path 501 are placed in a queue in the ring buffer 234 of the shared memory 233 to be provided to the DSP 215 after the resampled PCM data are provided to the DSP 215 (e.g. by the kernel driver 511).

In specific, example embodiments, any chunks and/or packets of audio streams arriving from the higher latency audio path 501 at the ring buffer 234 may be discarded (e.g. by the kernel driver 511) in favor of any chunks and/or packets of resampled PCM data arriving from the lower latency audio path 701 at the ring buffer 234.

Put another way, any chunks and/or packets arriving from the higher latency audio path 501 at the ring buffer 234 may be discarded and/or not placed in the ring buffer 234 (or any other buffer), while resampled PCM data from the low latency audio path 701 is being played by the DSP 215. Once resampled PCM data from the low latency audio path 701 is finished playing at the DSP 215 (and/or is out of the ring buffer 234), data from the audio streams produced by the higher latency audio path 501 continues to be fetched by the kernel thread 511 from the ring buffer 509 of the kernel ALSA driver to the ring buffer 234 of the shared memory 233. While such an embodiment may lead to up to about 200 ms of an audio stream from the higher latency audio path 501 being lost, such a loss is generally acceptable in order to expedite playing of "mission-critical" audio samples.

While present example embodiments are described with respect to the Android™ operating system, any device where a portion of audio samples used by an application are initially resampled according to a native sampling rate of a digital signal processor and pre-loaded at RAM buffers are within the scope of the present specification. Indeed, the method 300 may be used to reduce latency for playing such pre-loaded and resampled digital audio samples, as compared to audio samples that are not pre-loaded and resampled. Indeed, not all associated audio samples of an application need be initially resampled as doing so may increase the latency in booting up the application, as well as increase use of processing resources. Hence, in some embodiments, only a subset of associated audio samples of an application is resampled and pre-loaded at RAM buffers when an application is initially executed, for example by a controller, for example, those audio samples that are designated as being "mission-critical" and the like.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" can be construed as X only, Y only, Z only, or any combination of at least two items X, Y, and Z (e.g., XYZ, XY, YZ, ZZ, and the like). Similar logic can be applied for at least two items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A device comprising:
   a hardware digital signal processor (DSP);
   a higher latency audio path to the DSP;
   a lower latency audio path to the DSP, the lower latency audio path having lower latency than the higher latency audio path;
   a kernel driver;
   a kernel random-access memory (RAM) including kernel RAM buffers accessible by the kernel driver; and
   a controller configured to:
      prior to one or more digital audio samples being used by an application, pre-load, using the kernel driver, the one or more digital audio samples at the kernel RAM buffers;
      responsive to a trigger in the application to play a given digital audio sample, determine, using a sample identifier of the given digital audio sample, whether the given digital audio sample is pre-loaded at the kernel RAM buffers;
      when the given digital audio sample is pre-loaded at the kernel RAM buffers, play, using the DSP, the given digital audio sample via the lower latency audio path; and
      when the given digital audio sample is not pre-loaded at the kernel RAM buffers play, using the DSP, the given digital audio sample via the higher latency audio path.

2. The device of claim 1, wherein the given digital audio sample, played via the lower latency audio path, bypasses one or more portions of the higher latency audio path.

3. The device of claim 1, wherein the controller is further configured to, at each instance of the application triggering playing of a digital audio sample in the higher latency audio path: retrieve the digital audio sample from a system memory; and resample the digital audio sample according to a sampling rate native of the DSP.

4. The device of claim 1, wherein the controller is further configured to: resample, at the kernel driver, the one or more digital audio samples, according to a sampling rate native of the DSP, prior to pre-loading the one or more digital audio samples at the kernel RAM buffers.

5. The device of claim 1, wherein each of the one or more digital audio samples pre-loaded at the kernel RAM buffers is thereafter associated with a respective buffer identifier and a respective sample identifier.

6. The device of claim 1, wherein each of the one or more digital audio samples pre-loaded at the kernel RAM buffers is thereafter associated with a respective Boolean identifier indicating whether a respective digital audio sample is pre-loaded at the kernel RAM buffers.

7. The device of claim 1, wherein the controller is further configured to: determine using the sample identifier of the given digital audio sample, whether the given digital audio sample is pre-loaded at the kernel RAM buffers by determining whether the given digital audio sample is associated with a respective Boolean identifier indicating whether the given digital audio sample is pre-loaded at the kernel RAM buffers.

8. The device of claim 1, wherein the controller is further configured to: when the given digital audio sample is present in the kernel RAM buffers, play, using the DSP, the given digital audio sample via the lower latency audio path by providing a respective buffer identifier to the kernel driver.

9. The device of claim 1, wherein the controller is further configured to: retrieve, using the kernel driver, the given digital audio sample from the kernel RAM buffers using a respective buffer identifier, and provide the given digital audio sample to the DSP.

10. The device of claim 1, wherein the controller is further configured to: determine, at the application, a subset of a plurality of associated digital audio samples to be pre-loaded at the kernel RAM buffers as the one or more digital audio samples.

11. The device of claim 10, wherein the subset of the plurality of associated digital audio samples are designated as mission-critical audio samples.

12. A method comprising:
   prior to one or more digital audio samples being used by an application, pre-loading, at a controller of a device, the controller using a kernel driver, the one or more digital audio samples at kernel random-access memory (RAM) buffers of a kernel RAM, the kernel RAM buffers accessible by the kernel driver;
   responsive to a trigger in the application to play a given digital audio sample, determining, at the controller, using a sample identifier of the given digital audio sample, whether the given digital audio sample is pre-loaded at the kernel RAM buffers;
   when the given digital audio sample is pre-loaded at the kernel RAM buffers, playing, using a hardware digital signal processor (DSP), the given digital audio sample via a lower latency audio path; and
   when the given digital audio sample is not pre-loaded at the kernel RAM buffers playing, using the DSP, the given digital audio sample via a higher latency audio path.

13. The method of claim 12, wherein the given digital audio sample, played via the lower latency audio path, bypasses one or more portions of the higher latency audio path.

14. The method of claim 12, further comprising, at each instance of the application triggering playing of a digital audio sample in the higher latency audio path: retrieving the digital audio sample from a system memory; and resampling the digital audio sample according to a sampling rate native of the DSP.

15. The method of claim 12, further comprising: resampling, at the kernel driver, the one or more digital audio samples, according to a sampling rate native of the DSP, prior to pre-loading the one or more digital audio samples at the kernel RAM buffers.

16. The method of claim 12, wherein each of the one or more digital audio samples pre-loaded at the kernel RAM buffers is thereafter associated with a respective buffer identifier and a respective sample identifier.

17. The method of claim 12, wherein each of the one or more digital audio samples pre-loaded at the kernel RAM buffers is thereafter associated with a respective Boolean identifier indicating whether a respective digital audio sample is pre-loaded at the kernel RAM buffers.

18. The method of claim 12, further comprising: determining using the sample identifier of the given digital audio sample, whether the given digital audio sample is pre-loaded at the kernel RAM buffers, by determining whether the given digital audio sample is associated with a respective Boolean identifier indicating whether the given digital audio sample is pre-loaded at the kernel RAM buffers.

19. The method of claim 12, further comprising: when the given digital audio sample is present in the kernel RAM buffers playing, using the DSP, the given digital audio sample via the lower latency audio path by providing a respective buffer identifier to the kernel driver.

20. The method of claim 12, further comprising: retrieving, using the kernel driver, the given digital audio sample from the kernel RAM buffers using a respective buffer identifier, and provide the given digital audio sample to the DSP.

* * * * *